Patented June 16, 1936

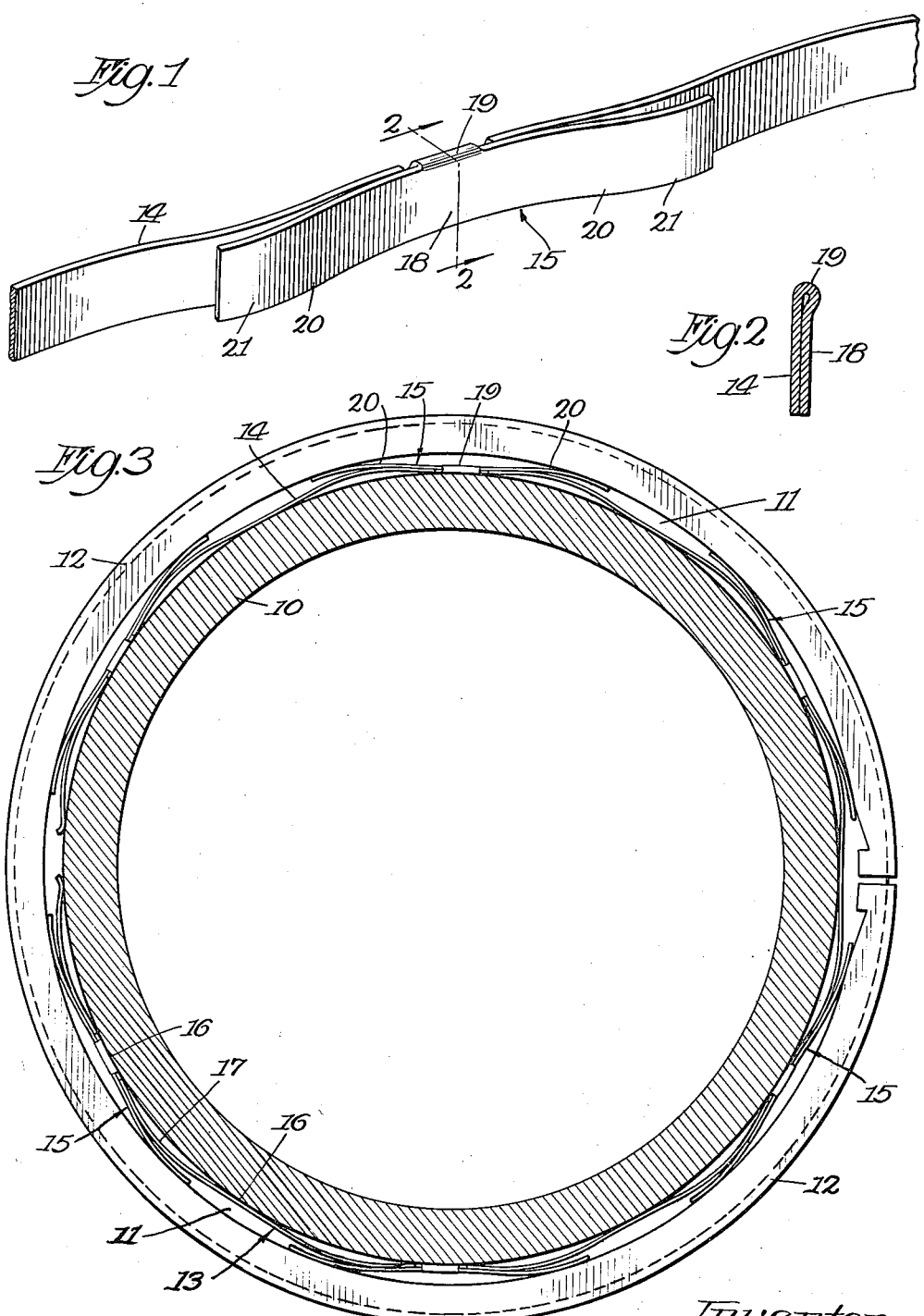

2,044,451

UNITED STATES PATENT OFFICE 2,044,451

PISTON RING EXPANDER

Charles N. Teetor, Hagerstown, Ind., assignor to The Perfect Circle Company, Hagerstown, Ind., a corporation of Indiana Application September 23, 1935, Serial No. 41,710

5 Claims. (Cl. 309—43)

My invention relates to piston ring expanders for internal combustion engines and the like, and it has to do more particularly with expanders of the type embodying a supporting band adapted to be mounted in a piston ring groove and carrying a plurality of spring members arranged to expandingly engage the piston ring.

One of the objects of my invention is to provide an improved piston ring expander of the foregoing character which is simple in construction and which is highly efficient and durable in use.

Another object is to provide a piston ring expander wherein the spring members include spring arms adapted to cooperate with the supporting band in such a way that the spring arms flex uniformly throughout their length thereby insuring longer spring life and the desired ring-expanding action.

A more specific object is to provide a piston ring expander of the foregoing character wherein the supporting band is provided with spring-acting portions or sections behind the spring arms of the spring members, the arrangement being such that the supporting band augments the expanding action of the spring members and cooperates with the spring arms of the spring members to avoid centralization of flexing or bending strains and stresses at any one point therein.

Other objects and advantages will become apparent as this description progresses and by reference to the drawing wherein,—

Figure 1 is a fragmentary perspective view of one form of expander embodying my invention;

Fig. 2 is a section taken substantially on line 2—2 of Fig. 1; and

Fig. 3 is a sectional plan view of a piston showing the expander in position behind a piston ring.

In the drawing, my invention is illustrated as applied to a piston 10 having a ring groove 11 in which a piston ring 12 is mounted. An expander 13 embodying my invention is mounted in the ring groove 11 behind the ring 12.

The expander includes a supporting band 14 and a plurality of integral spring members 15 which are, preferably, cut and formed from a sheet of soft steel and thereafter heat-treated and tempered so that they become hard and resilient and have the characteristics of spring steel. The supporting band 14 is, preferably, of a width substantially equal to the width of the ring groove 11, and it is of a length somewhat less than the circumference of the bottom of the ring groove.

In forming the band 14, it is given a wavy shape so that, when it is applied to the piston ring groove, it, due to the wavy shape thereof, seats upon the bottom of the ring groove at spaced points 16 with the intervening wave sections 17 spaced from the bottom of the ring groove and providing spring-acting sections in the expander band.

The spring members 15 each include an intermediate portion 18 connected to the upper edge of the supporting band 14 by a neck 19. It will be seen from the drawing that the spring members are connected to the band 14 at ring groove contacting points 16 therein or between the spring-acting sections 17 of the band. The intermediate portion of each spring member supports oppositely extending spring arms 20 which overlie the band 14, and particularly the spring-acting sections 17 thereof. The outer ring contacting points 21 of the spring arms are slightly bowed or curved so as to avoid any tendency of the sharp end edges of the spring arms to dig into the inner surface of the piston ring.

In forming the expander, I, preferably, turn the spring member 15 over and upon the band in such a way that its intermediate portion 18 seats against the band as best shown in Fig. 2. In this manner, and due to the bowed shape of the adjacent spring-acting sections 17 of the supporting band, the inner parts of spring arms 20 of the spring members 15 normally seat flush upon the spring sections 17 of the supporting band with the outer end parts thereof spaced from the band. The extent to which the spring arms 20 seat upon the band 14 depends, as will be appreciated, upon the amount of deflection of the spring arms in the performance of the expanding action. It will be seen from the foregoing that by arranging the spring arms 20 in the manner described, the expanding action of the spring arms 20 is augmented by the spring sections 17 of the band, and the spring support afforded by the spring band sections 17 tends to distribute flexing or bending strains and stresses in such spring arms throughout the length of the latter. In other words, tendency of the spring arms 20 to hinge or flex about any one point, as for example, at their junction with the intermediate portion 18, is avoided; and, as the spring arms 20 are flexed toward the supporting band 14, the spring support afforded by the band 14 causes the flexing or hinging points in the spring arms to gradually move toward the outer ends of the latter through the gradually increasing resistance to flexing action in the spring arms by the spring sections 17 of the band.

It is believed that the operation and advantages of my invention will be apparent from the foregoing; and it is to be understood that, although I have shown only one form of structure embodying my invention, other changes in details and arrangement of parts may be resorted to without departing from the spirit and scope of my invention as defined by the claims that follow.

I claim:

1. A piston ring expander comprising a spring metal supporting band, spring members carried by said band and each having an intermediate portion with spring arms extending therefrom in opposite directions and in overlying relation to said band, means connecting the intermediate portions of said spring members to said band, and said band being bowed outwardly beneath said spring arms providing spring sections in said band upon which said spring arms seat.

2. A piston ring expander comprising a spring metal supporting band having uniformly spaced bowed portions therein throughout its length, spring members each having an intermediate portion with spring arms extending in opposite directions therefrom, means for connecting the intermediate portion of each said spring member to said band with said spring arms each overlying and seated upon a bowed portion of said band with the outer ends of said spring arms free and spaced from said band, said band being adapted to seat upon the bottom of a ring groove with its bowed portions projecting toward a piston ring in the groove to cooperate with said spring arms in expanding the ring.

3. A piston ring expander comprising a wavy spring metal band in which the several waves are of substantially uniform depth providing a plurality of spring sections in said band, and spring members each having an intermediate portion carried by said band between adjacent of said spring sections and also having spring arms carried by said intermediate portion and overlying the outer face of said band, said spring arms being so constructed and arranged that they each seat in part upon said band spring sections with their end portions free and spaced from said band.

4. A piston ring expander comprising a supporting band formed of spring metal and having spaced spring-acting portions formed therein, spring members having intermediate portions with spring arms projecting in opposite directions therefrom, and means connecting the intermediate portion of each said spring member to said band between two of said spring-acting portions with said spring arms overlying the outer face of said band and seated for part way of their length upon the respective adjacent spring-acting band portions.

5. A piston ring expander comprising a spring metal supporting band and spring arms carried by said band in overlying relation thereto, said band being bowed outwardly beneath said spring arms to provide spring sections in said band upon which said spring arms seat.

CHARLES N. TEETOR.